United States Patent
Yokota

Patent Number: 5,414,856
Date of Patent: May 9, 1995

[54] MULTIPROCESSOR SHARED RESOURCE MANAGEMENT SYSTEM IMPLEMENTED AS A VIRTUAL TASK IN ONE OF THE PROCESSORS

[75] Inventor: Masayuki Yokota, Yokohama, Japan

[73] Assignee: Canon Kabushiki Kaisha, Tokyo, Japan

[21] Appl. No.: 725,639

[22] Filed: Jul. 3, 1991

[30] Foreign Application Priority Data

Jul. 10, 1990 [JP] Japan .................. 2-180477

[51] Int. Cl.$^6$ .............................................. G06F 13/36
[52] U.S. Cl. .................................... 395/725; 395/650; 364/228.1; 364/DIG. 1
[58] Field of Search ................. 395/725, 425, 800, 650

[56] References Cited

U.S. PATENT DOCUMENTS

| | | | |
|---|---|---|---|
| 3,643,218 | 2/1972 | Cranwinckel | 340/175 |
| 4,493,022 | 1/1985 | Nicolas et al. | 364/200 |
| 4,574,350 | 3/1986 | Starr | 364/200 |
| 4,794,515 | 12/1988 | Hornung | 395/650 |
| 4,953,072 | 8/1990 | Williams | 364/200 |
| 5,115,499 | 5/1992 | Stiffler et al. | 395/425 |
| 5,226,143 | 7/1993 | Baird et al. | 395/425 |
| 5,251,317 | 10/1993 | Iizuka et al. | 395/650 |

*Primary Examiner*—Thomas G. Black
*Assistant Examiner*—Larry J. Ellcessor
*Attorney, Agent, or Firm*—Fitzpatrick, Cella, Harper & Scinto

[57] ABSTRACT

A shared resource management system in a multiprocessor system comprises the steps of: requesting an accessing right from a processor requesting an accessing right to a shared resource to one processor in the system; taking the place of the request for the accessing right to the shared resource by the one processor; and establishing the accessing right by the one processor when the accessing is permitted and informing the acquirement of the accessing right to the accessing right requesting processor.

5 Claims, 3 Drawing Sheets

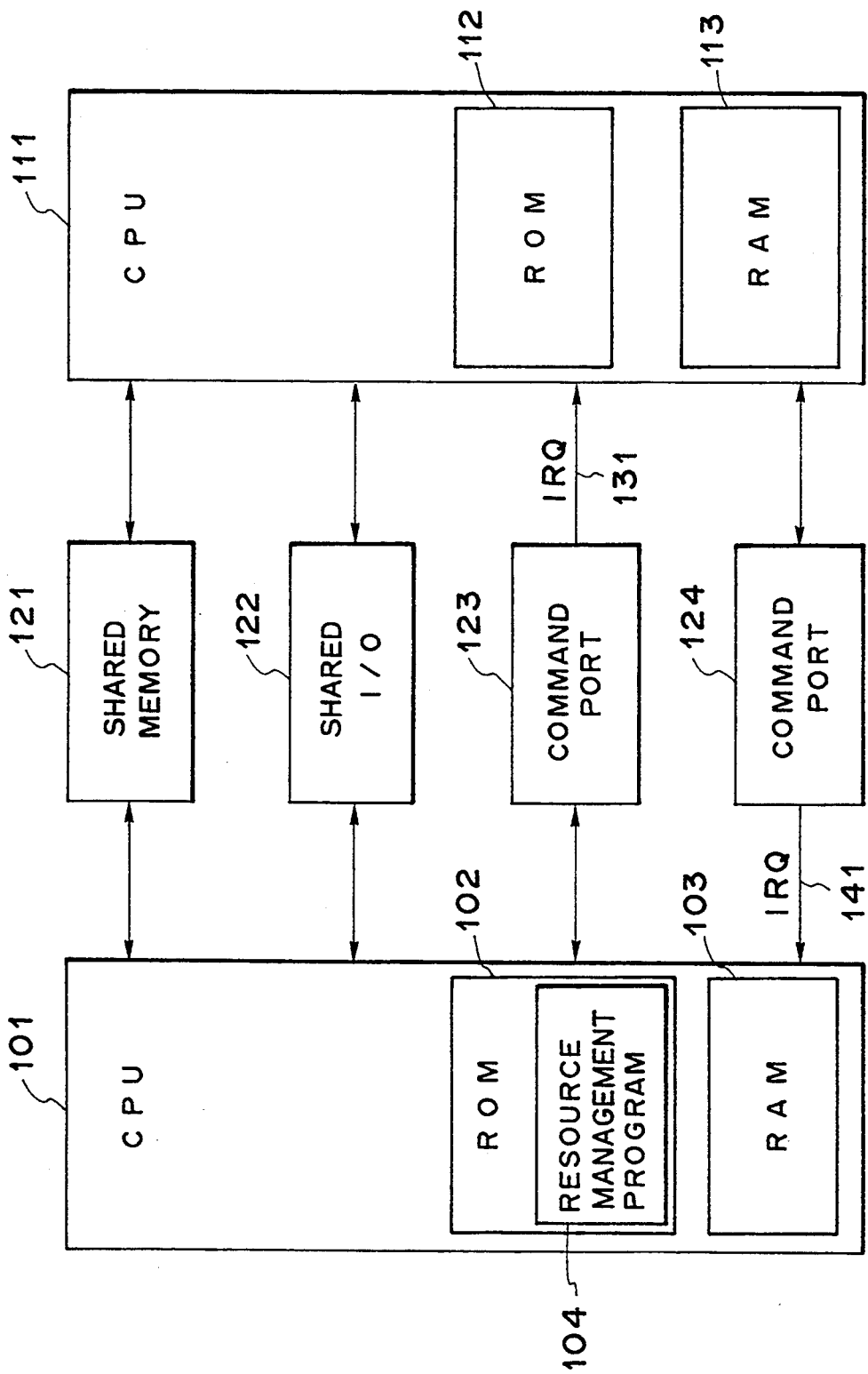

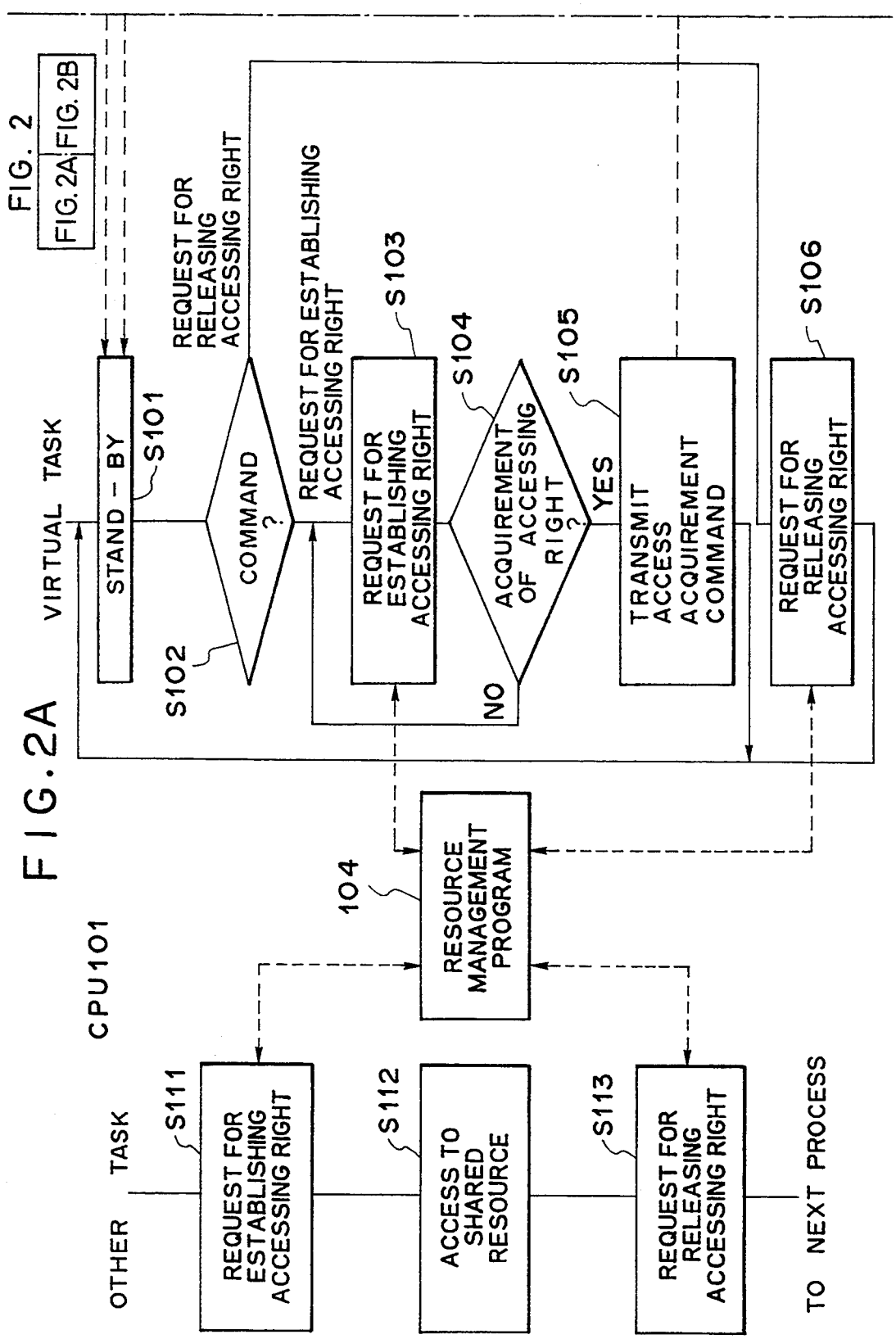

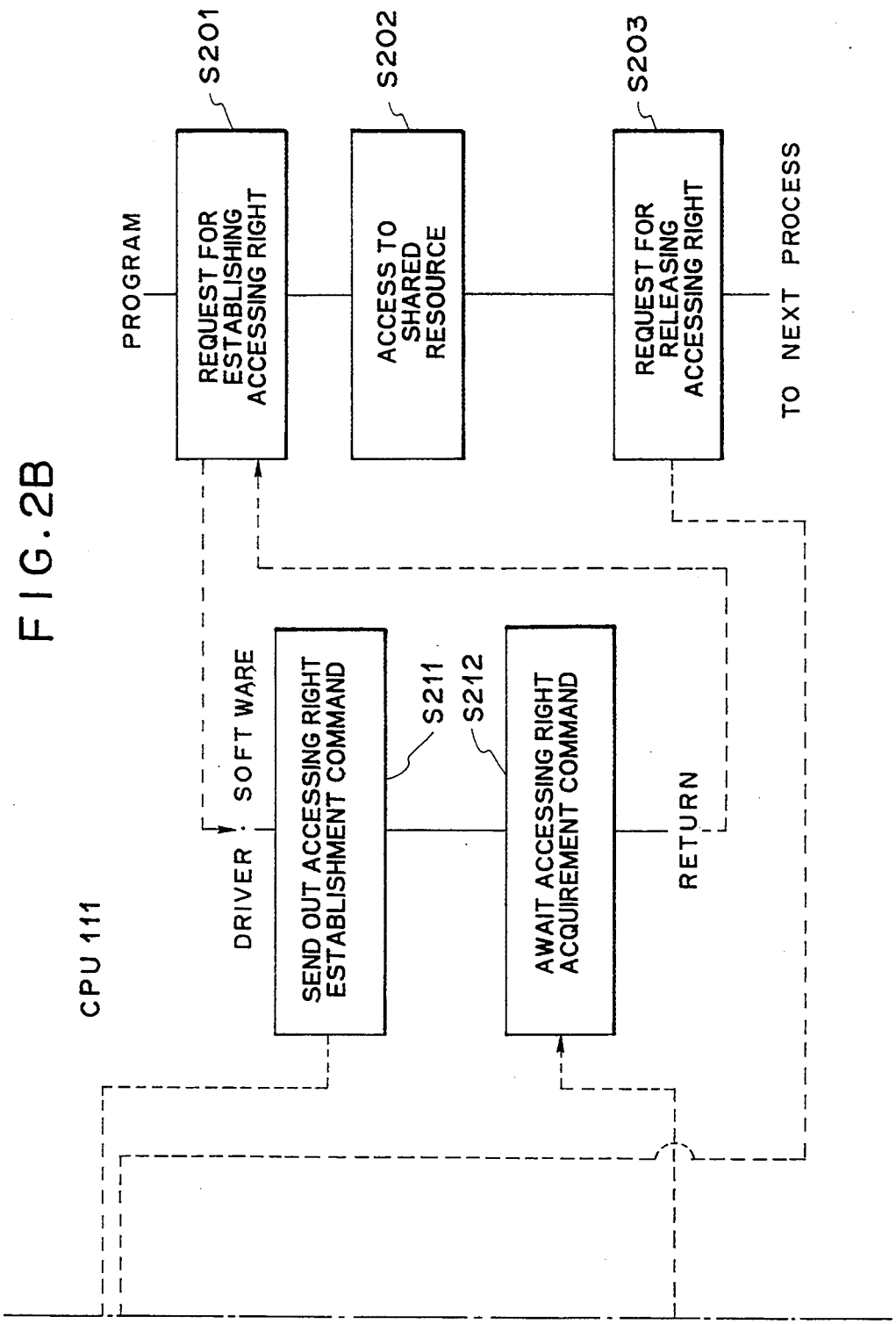

MULTIPROCESSOR SHARED RESOURCE MANAGEMENT SYSTEM IMPLEMENTED AS A VIRTUAL TASK IN ONE OF THE PROCESSORS

BACKGROUND OF THE INVENTION

1. Field of the Invention

The present invention relates to a resource management system which manages accessing to a shared resource in a multi-processor system comprising a plurality of CPU's.

2. Related Background Art

A multi-processor system has a shared memory and a shared I/O as shared resources and it is necessary to inhibit accessing to a shared resource used by one processor, by other processors. That is, an exclusive control is essential.

For such a system, a semaphore control system has been used. In the semaphore control system, when each CPU accesses a shared resource, it has a semaphore corresponding to individual resources, on the shared memory to control an accessing right in order to prevent mutual interference.

However, in the prior art, the accessing right control area such as a semaphore is provided on the shared memory, and if the accessing is permitted as a result of a check of the control area, the accessing right is established to access a block area in the shared memory, and if the accessing is not permitted, the check is repeated until the accessing is permitted.

This system has the following drawbacks.

(1) Assuming that the CPU's have the same priority level, when one CPU is permitted the access as a result of the check of the semaphore, another CPU may establish the accessing right earlier before the one CPU establishes the accessing right. In this case, access competition takes place between those CPU's. Thus, instead of one semaphore, a plurality of check mechanisms or a new cycle need be provided. As a result, the process is complex and a longer time is needed before the accessing actually starts.

(2) In order to rapidly check and establish the accessing right, it is necessary to prioritize the accessing rights among the CPU's. However, this needs the prioritization for each resource and the process is complex and of large amount.

SUMMARY OF THE INVENTION

It is an object of the present invention to provide a shared resource management system in a multi-processor system which permits each processor to access to a shared resource in a simple and rapid manner.

It is another object of the present invention to provide a shared resource management system in a multi-processor system which permits the avoidance of access conflict among processors by a simple control.

According to one aspect, the present invention which achieves those objects relates to a shared resource management system in a multi-processor system comprising the steps of:

requesting an accessing right from a processor requesting an accessing right to a shared resource to one processor in the system;

taking the place of the request for the accessing right to the shared resource by the one processor; and establishing the accessing right by the one processor when the accessing is permitted and informing the acquirement of the accessing right to the accessing right requesting processor.

According to another aspect, the present invention which achieves those objects relates to a processor sharing a resource with another processor, comprising:

accept means for accepting a request for an accessing right to the shared resource from the other processor;

decision means for determining the acceptance or the rejection of the accessing to the shared source in accordance with the accepted request for the accessing right;

establish means for establishing the accessing right when the decision means determines the acceptance; and inform means for informing the acquirement of the accessing right to the processor requested the accessing right after the establish means has established the accessing right.

According to still another aspect, the present invention which achieves those objects relates to a processor sharing a resource with another processor comprising:

command means for commanding to request an accessing right to one processor sharing the resource;

means for receiving a notice of acquirement of the accessing right from the one processor; and access means for accessing in response to the notice.

Other objectives and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determinating the scope of the invention.

BRIEF DESCRIPTION OF THE DRAWINGS

FIG. 1 shows a block diagram of a multi-processor system in one embodiment, and

FIG. 2 shows a flow chart of a process procedure of a resource management system in one embodiment.

DETAILED DESCRIPTION OF THE PREFERRED EMBODIMENTS

One embodiment of the present invention is now explained with reference to the drawings.

FIG. 1 shows a block diagram of a multi-processor system in the present embodiment which realizes the resource management system of the present invention. In the present embodiment, it is assumed that the multi-processor system comprises two CPU's.

A first CPU 111 has a ROM 112 and a RAM 113 for storing and executing a program. A second CPU 101 also has a ROM 102 and a RAM 103 for storing and executing a program as the first CPU 111 does. Further, the second CPU 101 attains a multi-task environment so that the ROM 102 stores a resource management program 104 by which each task tests an accessing right to a resource for the resource management and establishes the accessing right if it is permitted to access.

Numerals 121 and 122 denote a shared memory and a shared I/O which are shared resources to the CPU's 101 and 111. Numeral 123 denotes a command port for sending a command from the CPU 101 to the CPU 111. Similarly, numeral 124 denotes a command port for sending a command from the CPU 111 to the CPU 101.

Numerals 131 and 141 denote interruption signals IRQ which are generated when the CPU's 101 and 111 send the commands to the CPU's 111 and 101 through the command ports 123 and 124, respectively.

In the above arrangement, the CPU 101 accepts a test and set command for the accessing right from the other CPU through the command port and establishes a virtual task for executing the test and set command in place of the CPU. The CPU 101 realizes the multi-task environment. Each task tests the accessing right to the resource for the resource management by the accessing right test and set function, and establishes the accessing right if the access is permitted.

The virtual task fetches the test and set command, and if the accessing right is granted, sends back an acknowledge command to the commanding CPU through the command port.

On the other hand, when the CPU other than the CPU 101 is called for the test and set function by the program, it sends the test and set command to the CPU 101 through the command port as if it would execute the test and set function to the shared resource, waits for an acknowledge command from the CPU 101, and if it receives the acknowledge command, it returns to a program routine by driver software.

FIG. 2 shows a flow chart of a process in the resource management system of the present invention. The process in the present embodiment is explained with reference to FIG. 2.

When the CPU 111 is to access to one block in a shared resource, for example, a shared memory, the program in the CPU 111 requests to establish an accessing right in a step S201. In the CPU 111, driver software for requesting the establishment of the accessing right to the CPU 101 is called. In a step S211, an access establishment command is sent to the CPU 101 through the command port 124. When the access establishment command is set to the command port 124, a command interruption signal IRQ 141 is issued.

In the CPU 101, in response to the IRQ 141, the virtual task is in the stand-by state in a step S101 is started. The virtual task analyzes the command in a step S102, and when it is the request for establishing the accessing right, it sends a request for establishing the accessing right which takes the place of the step S201, to the resource management program 104 of the CPU 101 in a step S103. The resource management program 104 tests the availability of access by the test and set function. If the shared resource is occupied, the process returns from the step S104 to the step S103 to repeat the above test process. If the shared resource is not occupied, the resource management program 104 establishes the accessing right and imparts an exclusive right to the virtual task. The virtual task proceeds to a step S105, returns the accessing right acquirement command to the CPU 111 through the command port 123, returns to the step S101, and stands by.

In the CPU 111, in response to the interruption signal IRQ 131 issued by the establishment of the accessing right acquirement command, the driver software of the CPU 111 which has been waiting for the accessing right acquirement command in the step S212 is started and the process returns to the program of the calling CPU. Since the program can occupy the block of the shared memory under consideration, the accessing to the shared resource is permitted in the step S202.

When the CPU 111 completes the accessing to the shared resource, a request to release the accessing right is sent to the CPU 101 in a step S203. Notice of end of access may be used as the release request.

The virtual task of the CPU 101 which is in the stand-by state in the step S101 analyzes the command in the step S102. Since it is the request for releasing the accessing right, it clears the semaphore in a step S106 and opens the shared resource to other tasks. Then, the virtual task stands by.

On the other hand, the request for establishing the accessing right by the program of the CPU 101 (step S111) and the request for releasing the accessing right (step S113) are processed in a similar manner to the step S201 and S206 of the virtual task. Accordingly, the request for establishing the accessing right in the step S201 of the CPU ill and the request for establishing the accessing right in the step S111 of the CPU 101, and the request for releasing the accessing right in the step S203 and the request for releasing the accessing right in the step S113 are uniformly processed by the resource management program 104 of the CPU 101, without any discrimination in the processing.

In the present embodiment, the CPU 101 uses the same virtual task for establishing and releasing the accessing right, although different virtual tasks may be used for establishing and releasing.

In accordance with the resource management system of the present invention, the accessing to the shared resource by a plurality of CPU's is processed in the same manner as the accessing by the multi-task operating on a single CPU and the test of the accessing right and the establishment of the accessing right are executed on one CPU.

The test and establishment of the accessing right from each CPU to the shared resource can be managed in the uniform manner without prioritizing the CPU's and without being influenced by the characteristic of the resource.

I claim:

1. A method for making an access to a shared resource by one of a plurality of processors in a multiprocessor system, wherein each of the processors executes respective tasks concurrently, said method comprising the steps of:

generating a request for an access to the shared resource in each of the processors when the access is required in each of the processors;

transmitting the request to a first predetermined processor of the plurality of processors from a second processor of the plurality of processors other than the first predetermined processor when the request is generated in the second processor;

determining whether or not the access is permitted according to the request generated in the first predetermined processor or the request transmitted from the second processor, by the first predetermined processor;

establishing an accessing right corresponding to the access determined to be permitted, by the first predetermined processor;

informing the acquisition of the accessing right to the second processor by the first predetermined processor when the accessing right corresponding to the access according to the request transmitted from the second processor is established;

accessing to the shared resource by the second processor when the second processor is informed of the acquisition of the accessing right;

transmitting a command for the release of the accessing right to the first predetermined processor from the second processor after the second processor has completed the access to the shared resource; and releasing the accessing right according to the command transmitted from the second processor by the first predetermined processor.

2. A method according to claim 1 wherein the first predetermined processor processes the request transmitted from the second processor as a virtual task on the first predetermined processor.

3. A method according to claim 1 wherein the first predetermined processor processes a plurality of co-existing requests as the request from a multi-task on the first predetermined processor.

4. A method according to claim 1, further comprising the step of accessing to the shared resource by the first predetermined processor when the accessing right corresponding to the access according to the request generated in the first predetermined processor is established.

5. A multi-processor system having a plurality of processors and a resource shared by the plurality of processors, wherein each of the processors executes respective tasks concurrently, and said plurality of processors include a first predetermined processor and second processors other than the first predetermined processor, said first predetermined processor comprising:

generation means for generating a request for an access to the shared resource when the access is required in the first predetermined processor;

reception means for receiving a request for an access to the resource from one of the second processors;

determining means for determining whether or not the access according to the request generated by said generating means or the request received by said reception means is permitted;

establishing means for establishing an accessing right corresponding to the access determined to be permitted by said determining means;

informing means for informing the acquisition of the accessing right to said one of the second processors when the accessing right corresponding to the access according to the request received from said one of the second processors is established by said establishing means, each of said second processors comprising:

second generation means for generating a request for an access to the shared resource when the access is required in said second processor;

transmission means for transmitting the request generated by said second generation means to said reception means;

second reception means for accepting information on the acquisition of the accessing right from said informing means;

accessing means for accessing to the shared resource when the information on the acquisition of the accessing right is received by said second reception means; and second transmission means for transmitting a command for the release of the accessing right to the first predetermined processor after the access by said accessing means has completed, said first predetermined processor further comprising releasing means for releasing the accessing right according to the command transmitted from said second transmission means.

* * * * *